United States Patent
Kim et al.

(10) Patent No.: US 8,076,808 B2
(45) Date of Patent: Dec. 13, 2011

(54) FLAT TYPE VIBRATION MOTOR

(75) Inventors: Yong Tae Kim, Gyunggi-do (KR); Sang Won Kim, Gyunggi-do (KR); Sang Gil An, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 12/554,819

(22) Filed: Sep. 4, 2009

(65) Prior Publication Data

US 2011/0025149 A1 Feb. 3, 2011

(30) Foreign Application Priority Data

Jul. 28, 2009 (KR) ........................ 10-2009-0069054

(51) Int. Cl.
*H02K 7/065* (2006.01)
*H02K 7/075* (2006.01)

(52) U.S. Cl. ......................................................... 310/81
(58) Field of Classification Search .................. 310/81
See application file for complete search history.

(56) References Cited

U.S. PATENT DOCUMENTS

| 3,670,405 | A | * | 6/1972 | Dochterman | 29/596 |
|---|---|---|---|---|---|
| 5,036,239 | A | * | 7/1991 | Yamaguchi | 310/268 |
| 5,793,133 | A | * | 8/1998 | Shiraki et al. | 310/81 |
| 6,169,348 | B1 | * | 1/2001 | Won | 310/81 |
| 6,291,915 | B1 | * | 9/2001 | Yamaguchi | 310/71 |
| 6,534,886 | B2 | * | 3/2003 | An et al. | 310/81 |
| 6,713,911 | B2 | * | 3/2004 | Yamaguchi | 310/81 |
| 6,765,331 | B2 | * | 7/2004 | Koyanagi et al. | 310/268 |
| 6,841,905 | B2 | * | 1/2005 | Yamaguchi | 310/81 |
| 6,853,109 | B2 | * | 2/2005 | Koyanagi et al. | 310/233 |
| 7,352,093 | B2 | * | 4/2008 | Kim | 310/81 |

FOREIGN PATENT DOCUMENTS

| JP | 2001-104882 | * | 4/2001 |
|---|---|---|---|
| KR | 1020010057867 | | 7/2001 |
| KR | 1020060055786 | | 5/2006 |

* cited by examiner

*Primary Examiner* — Burton Mullins
(74) *Attorney, Agent, or Firm* — Blakely Sokoloff Taylor & Zafman LLP

(57) ABSTRACT

Disclosed herein is a flat type vibration motor. The motor includes a bracket having a shaft mounted to the central portion of the bracket, with a lower substrate and a magnet being adhered to the upper surface of the bracket. A casing covers the upper portion of the bracket, and defines an internal space. An upper substrate has on a lower surface thereof a commutator. A coil and a weight are adhered to the upper surface of the upper substrate. A resin member is provided on some portion of the upper substrate and has a bearing holding hole. A bearing is held in the bearing holding hole and rotatably supported by the shaft. A brush is secured at a first end thereof to the lower substrate and contacts at a second end thereof to the commutator to form a contact part.

6 Claims, 5 Drawing Sheets

FLAT TYPE VIBRATION MOTOR

CROSS REFERENCE TO RELATED APPLICATION(S)

This application claims the benefit of Korean Patent Application No. 10-2009-0069054, filed on Jul. 28, 2009, entitled "FLAT TYPE VIBRATION MOTOR", which is hereby incorporated by reference in its entirety into this application.

BACKGROUND OF THE INVENTION

1. Technical Field

The present invention relates to a flat type vibration motor.

2. Description of the Related Art

In order to prevent people from being annoyed by the noise of portable electronic devices such as mobile phones, electronic games, or personal digital assistants, a variety of types of vibration generators are applied to the portable electronic devices. Particularly, the vibration generators are installed in the mobile phones and used as mute generators informing of the arrival of signals. In recent years, as mobile phones are becoming miniaturized and slimmed, the vibration generators installed in the mobile phones also require miniaturization and high performance.

The vibration generators use a variety of types of vibration motors as a vibration source. The vibration motors are classified into a flat type vibration motor and a cylinder type vibration motor according to the shape, and are classified into a brush type vibration motor and a brushless type vibration motor according to the existence or non-existence of a brush. Among them, the flat type vibration motor having the brush may be manufactured to be thin, so that this motor advantageously realizes the miniaturization of a mobile phone. For this reason, currently, the flat type vibration motor having the brush has been widely used.

FIG. 1 is a sectional view illustrating a conventional flat type vibration motor having a brush, and FIGS. 2 and 3 are a top perspective view and a bottom perspective view, respectively, illustrating a rotor of the flat type vibration motor having the brush of FIG. 1.

As shown in FIGS. 1 to 3, the conventional flat type vibration motor 10 having the brush includes a bracket 11 on which a lower substrate 13 is mounted. A casing 15 covers the upper portion of the bracket 11 to define an internal space. A shaft 12 is supported by the bracket 11. A magnet 14 which is a stator is mounted to an edge of an upper surface of the bracket 11. A rotor 16 is eccentrically and rotatably installed to the shaft 12.

Here, the rotor 16 includes an upper substrate 16a having on its lower surface a commutator 16b. A bearing 16c is rotatably supported by the shaft 12. A coil 16d and a weight 16e are mounted on the upper surface of the upper substrate 16a. A molding member 16f integrally couples the upper substrate 16a, the coil 16d, and the weight 16e with each other.

Further, one end of the brush 17 is connected to the lower substrate 13 through soldering, and the other end of the brush 17 is connected to the commutator 16b, thus transmitting external power to the coil 16d.

In the brush type vibration motor 10 constructed as described above, when external power flows sequentially through the lower substrate 13, the brush 17, and the commutator 16b and is then supplied to the coil 16d, the rotor 16 is rotated by an electromagnetic force generated between the coil 16d and the magnet 14 and thus vibration is generated.

The rotor 16 of the conventional flat type vibration motor 10 constructed as described above is manufactured as follows. That is, the coil 16d and the weight 16e are bonded to the upper substrate 16a. The bonded assembly and the bearing 16c rotatably supported by the shaft 12 are insert molded using the molding member 16f, thus providing the rotor 16 in the form of one unit. In the rotor 16 manufactured in this way, the molding member 16f is formed throughout a whole area of the upper substrate 16a.

However, when the injection molding process is performed with the coil 16d and the weight 16e bonded to the upper substrate 16a, oil may leak out from the bearing 16c, thus undesirably generating a noise. Further, the coil 16d may become severed or deformed. Furthermore, since the rotor 16 is manufactured in the form of one unit, production yield may be reduced.

SUMMARY OF THE INVENTION

The present invention has been made in an effort to provide a flat type vibration motor, which is capable of preventing oil from leaking out from a bearing and preventing a coil from becoming severed or deformed in an injection molding process.

In a flat type vibration motor according to an embodiment of the present invention, a bracket has a shaft mounted to a central portion of the bracket, with a lower substrate and a magnet being adhered to the upper surface of the bracket. A casing covers the upper portion of the bracket, and defines an internal space. An upper substrate has on a lower surface thereof a commutator. A coil and a weight are adhered to the upper surface of the upper substrate. A resin member is provided on some portion of the upper substrate and has a bearing holding hole. A bearing is held in the bearing holding hole and rotatably supported by the shaft. A brush is secured at a first end thereof to the lower substrate and contacts at a second end thereof to the commutator to form a contact part.

The coil and the weight may be adhered to the upper substrate using an adhesive or double-sided tape.

Further, the resin member may be injection molded integrally with the upper substrate.

The resin member may be manufactured through injection molding and be secured to the upper substrate through force-fitting.

Further, the bearing may be held in the bearing holding hole through force-fitting.

The bearing may be adhered to the bearing holding hole using an adhesive.

Further, in a flat type vibration motor according to another embodiment of the present invention, a bracket has a shaft mounted to a central portion of the bracket, with a lower substrate and a magnet being adhered to the upper surface of the bracket. A casing covers the upper portion of the bracket, and defines an internal space. An upper substrate has on a lower surface thereof a commutator. A coil and a weight are adhered to the upper surface of the upper substrate. A resin member is provided on some portion of the upper substrate, and has a shaft insertion hole therein to support the shaft. A brush is secured at a first end thereof to the lower substrate, and contacts at a second end thereof to the commutator to form a contact part.

The coil and the weight may be adhered to the upper substrate using an adhesive or double-sided tape.

Further, the resin member is injection molded integrally with the upper substrate.

The resin member may be manufactured through injection molding and be secured to the upper substrate through force-fitting.

DESCRIPTION OF THE PREFERRED EMBODIMENTS

Figure 1:
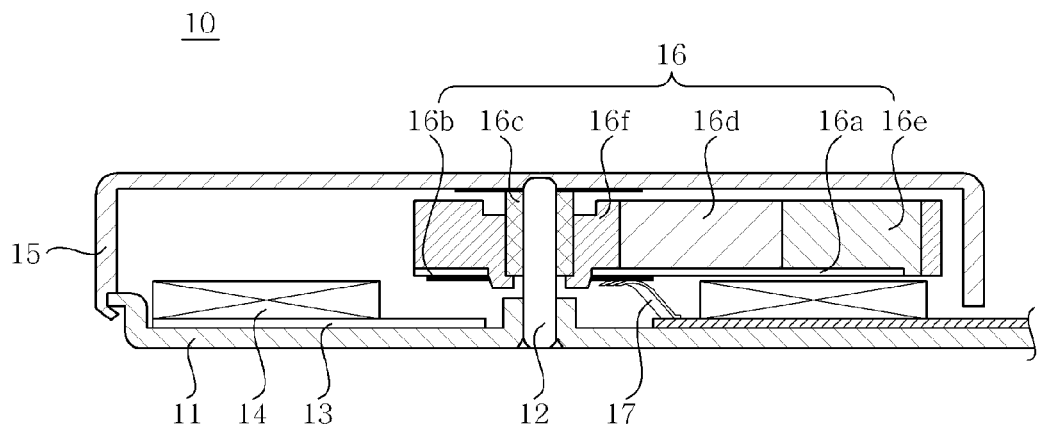
FIG. 1 is a sectional view illustrating a conventional flat type vibration motor having a brush.
Figure 2:
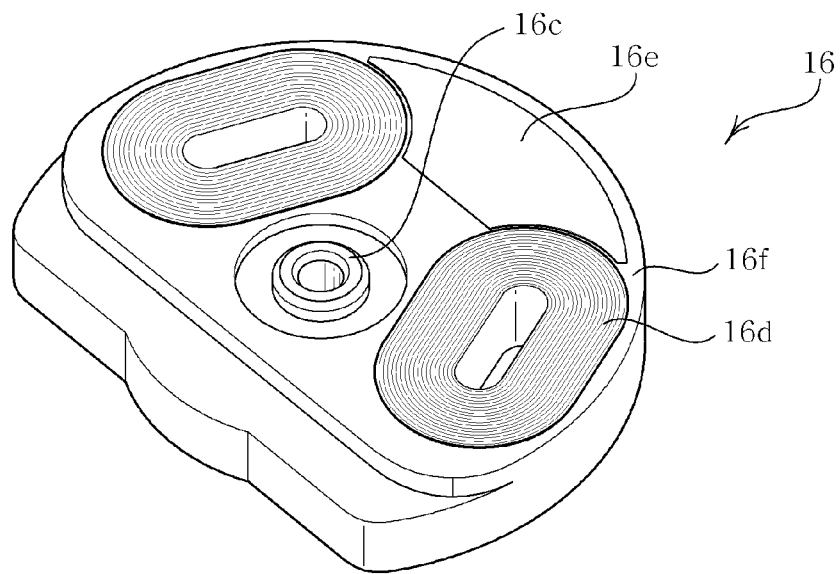
FIGS. 2 and 3 are a top perspective view and a bottom perspective view, respectively, illustrating a rotor of the flat type vibration motor having the brush of FIG. 1.
Figure 3:
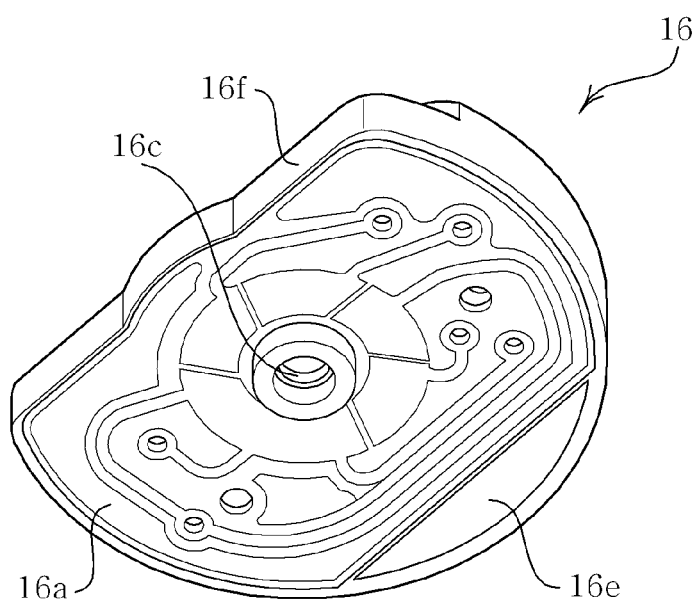

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. Herein, the same reference numerals are used throughout the different drawings to designate the same components. Further, when it is determined that the detailed description of the known art related to the present invention may obscure the gist of the present invention, the detailed description thereof will be omitted herein.

Hereinafter, flat type vibration motors according to the preferred embodiments of the present invention will be described in detail with reference to the accompanying drawings.

Flat Type Vibration Motor

First Embodiment

Figure 4:
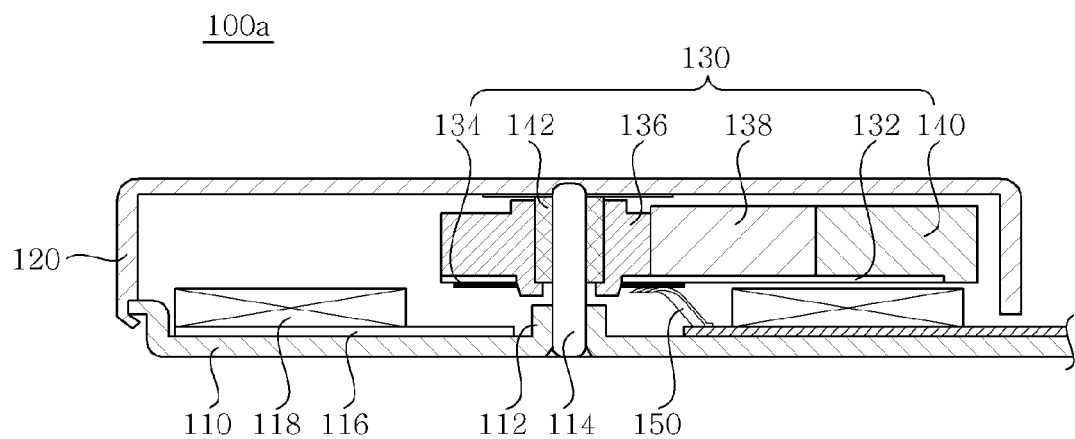
FIG. 4 is a sectional view illustrating a flat type vibration motor according to a first embodiment of the present invention.
Figure 5:
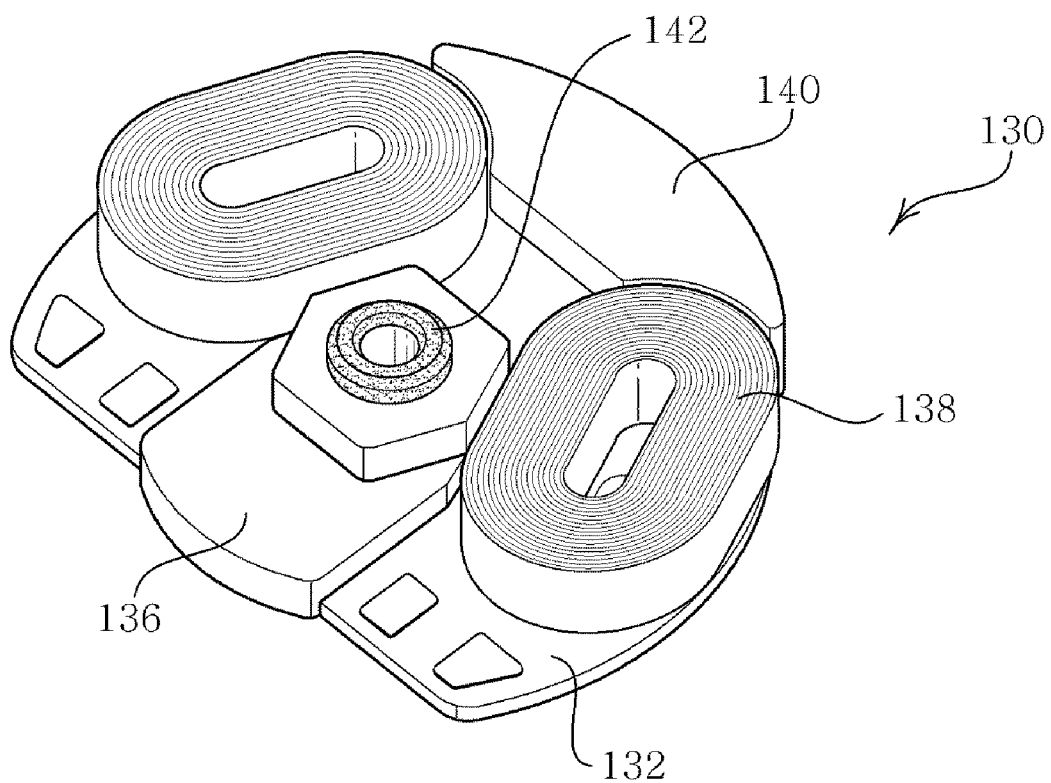
FIGS. 5 and 6 are a top perspective view and a bottom perspective view, respectively, illustrating a rotor of the flat type vibration motor of FIG. 4.
Figure 6:
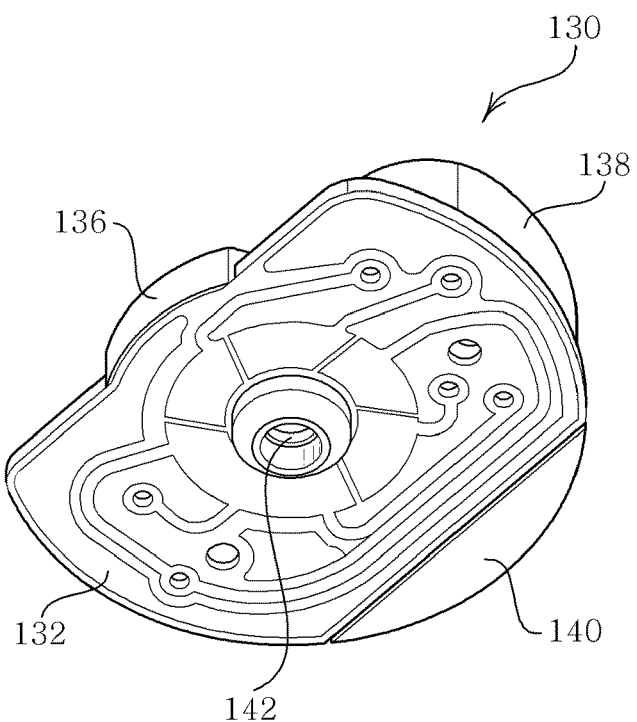

FIG. 4 is a sectional view illustrating a flat type vibration motor according to a first embodiment of the present invention, and FIGS. 5 and 6 are a top perspective view and a bottom perspective view, respectively, illustrating a rotor of the flat type vibration motor of FIG. 4. The flat type vibration motor 100a according to this embodiment will be described below with reference to the accompanying drawings.

As shown in FIGS. 4 to 6, the flat type vibration motor 100a according to this embodiment includes a bracket 110, a casing 120, a rotor 130, and a brush 150.

The bracket 110 supports components of the vibration motor, is assembled with the casing 120 to define a predetermined internal space, and has the shape of a disc having a predetermined thickness. A shaft 114 is mounted to the central portion of the bracket 110, and a lower substrate 116 and a magnet 118 are adhered to the upper surface of the bracket 110.

Preferably, a burring part 112 is provided on the central portion of the bracket 110 in such a way as to protrude upwards, thus holding the shaft 114. One end of the shaft 114 is press-fitted into the burring part 112 so that the shaft 114 is vertically erected and supported.

The lower substrate 116 is provided with a terminal which is connected to external power so as to supply power, and is adhered to the upper surface of the bracket 110. Here, one end of the brush 150 which will be described in detail later is connected to the lower substrate 116 through soldering. Meanwhile, as seen from the drawings, the lower substrate 116 and the bracket 110 are separately manufactured. However, the lower substrate 116 and the bracket 110 may be integrated into a single structure using the same material. Such a construction also falls within the scope of the present invention.

The magnet 118 generates a magnetic field of a predetermined intensity which interacts with the coil 138 to rotate the rotor 130, and is bonded onto the lower substrate 116 via adhesive. Here, the magnet 118 is arranged in an annular form around the shaft 114 which is perpendicularly secured to the bracket 110, and comprises a permanent magnet which is alternately magnetized to have a plurality of magnetic poles in a circumferential direction. The magnet 118 is placed to face the coil 138 which will be described in detail later.

The casing 120 protects the vibration motor from external impact, and is a component receiving part for providing a rotating space for the rotor 130, namely, for providing an internal space. The casing 120 is assembled with the bracket 110 to cover the upper portion of the bracket 110, thus creating the internal space.

Here, the casing 120 is made of a magnetic material which has considerable magnetic permeability to form a magnetic path of magnetic flux which is generated in the magnet 118 and the coil 138 of the rotor 130 and is of sufficient strength to prevent the rotor 130 from being constrained by deformation resulting from external force.

Preferably, a friction reduction member, the reference numeral of which is omitted in the drawings, is provided in the center in the casing 120. The friction reducing member is in direct contact with the rotor 130 to reduce friction and noise.

Meanwhile, according to this embodiment, the bracket 110 has a disc-shaped structure and the casing 120 covers the upper portion of the bracket 110 to provide a predetermined internal space. However, it is to be understood that the form of the invention herein shown and described is to be taken as a preferred example. That is, any structure is possible as long as the bracket 110 and the casing 120 are assembled with each other to provide a rotating space for the rotor 130.

The rotor 130 is eccentrically rotated to generate vibration, and includes an upper substrate 132, a resin member 136, a coil 138, a weight 140, and a bearing 142.

The upper substrate 132 functions to support the components of the rotor 130 and transmit power to the coil 138. The upper substrate 132 has the shape of a semicircular flat plate, a part of which is cut to be eccentric. A through hole is formed in the central portion of the upper substrate 132 so that the shaft 114 and the bearing 142 are inserted into the through hole.

Here, a commutator 134 divided into a plurality of segments is provided on the lower surface of the upper substrate 132 in such a way as to be arranged around the through hole in an annular form. Such a commutator 134 contacts the brush which will be described in detail later, thus transmitting power to the coil 138, and is formed through pattern printing or plating.

The resin member 136 is formed on the upper substrate 132 to hold the bearing 142. The resin member 136 which has a hole for holding the bearing 142 is formed on the upper substrate 132.

Unlike a conventional vibration motor, the resin member 136 is not formed throughout the whole area of the upper substrate 132 but is formed on a minimum area around a portion into which the bearing 142 is inserted to have the bearing holding hole. In order to be firmly secure the resin member 136 to the upper substrate 132, the resin member 136 extends to a side end of the upper substrate 132 in such a way as to surround the side end of the upper substrate 132. Preferably, the bearing 142 is slightly higher than the upper substrate 132 to stably support the shaft 114, and the resin member 136 supporting the bearing 142 is also formed to be slightly higher than the upper substrate 132 by a predetermined height. As shown in the drawing, preferably, the resin member 136 formed around the bearing holding hole is formed on the upper substrate 132 to be higher than the upper substrate 132 by a predetermined height, thus covering the height of the bearing 142, and the resin member 136 is formed to pass through the through hole of the upper substrate 132 in such a way as to protrude downwards from the upper substrate 132.

Here, the resin member 136 may be injection molded together with the upper substrate 132. Alternatively, after the resin member 136 and the upper substrate 132 are separately injection molded, the resin member 136 is force fitted into the upper substrate 132. In the case where the resin member 136 is injection molded separately from the upper substrate 132, the resin member 136 is preferably provided with a hook so that the resin member 136 is firmly secured to the upper substrate 132.

Unlike the conventional vibration motor, according to this embodiment, without the coil 138 and the bearing 142, the resin member 136 is injection molded together with the upper substrate 132, or the resin member 136 is injection molded separately from the upper substrate 132 and then is adhered to the upper substrate 132. This prevents the leakage of oil from the bearing 142 or the severing and/or deformation of the coil 138 due to injection pressure and injection temperature during the injection molding process. Further, in order to overcome the above problems, the injection pressure and injection temperature during the injection molding process of the conventional vibration motor are limited. However, according to the present invention, the injection pressure and the injection temperature may be increased, so that the degree of freedom of the injection molding process is increased. Therefore, the injection molding process may be conducted with a plurality of upper substrates 132 being arrayed, so that the productivity of the injection molding process (reduction in labor required in the injection molding process and increase in productivity) is increased. Meanwhile, since a subsequent process may be performed in the arrayed state, the efficiency of the process can be increased.

The coil 138 generates an electric field of a predetermined intensity when power is applied to the coil 138. When power is applied through the commutator 134 contacting the brush 150 to the coil 138, the coil 138 generates the electric field. By the interaction between the electric field of the coil 138 and the magnetic field generated in the magnet 118, an electromagnetic force is generated, thus rotating the rotor 130.

Here, at least one coil 138 is adhered to the upper surface of the upper substrate 132 via an adhesive or double-sided tape. According to this embodiment, after the resin member 136 is formed on the upper substrate 132 through the injection molding process, the coil 138 is adhered to the upper substrate 132, thus preventing the coil 138 from becoming severed or deformed by the injection pressure and the injection temperature.

The weight 140 adds to a predetermined mass so that the rotor 130 is eccentrically rotated. At least one weight 140 is adhered to the upper surface of the upper substrate 132 via an adhesive or double-sided tape, and is made of metal having high specific gravity such as tungsten.

According to this embodiment, after the resin member 136 is formed on the upper substrate 132 through the injection molding process, the weight 140 is adhered to the upper substrate 132. Thus, the weight 140 may be placed on the outermost circumference of the rotor 130, so that the quantity of eccentricity is increased and the whole vibratory force is improved in comparison with the conventional vibration motor.

That is, the quantity of eccentricity of the rotor 130 is a physical quantity which is obtained by multiplying a distance from the center of the rotor 130 to the center of gravity by the weight of the rotor 130. In this regard, when the weight 140 is placed on the outermost circumference of the rotor 130, the eccentric distance to the center of gravity is increased. Consequently, the quantity of eccentricity can be increased. Moreover, if the weight 140 is formed to be slightly larger than the conventional weight, the weight of the rotor 130 is increased, so that vibratory force is enhanced.

The bearing 142 is rotatably supported by the shaft 120 and is inserted into the bearing holding hole of the resin member 136.

Here, the bearing 142 may be secured to the bearing holding hole through force-fitting or using an adhesive.

In this embodiment, after the resin member 136 is formed on the upper substrate 132 through injection molding, the bearing 142 is fitted. Thus, the leaking of oil from the bearing 142 due to the injection pressure and the injection temperature can be prevented.

The brush 150 functions to apply power to the commutator 134. One end of the brush 150 is secured to the upper surface of the lower substrate 116, whereas the other end is in elastic contact with the commutator 134 which is provided on the lower surface of the upper substrate 132.

Here, the lower substrate 116 is connected to a power supply unit (not shown) to supply power to the brush 150. The power supply unit includes an anode terminal and a cathode terminal (not shown) to supply current of different polarities through a pair of brushes 150 to the segments of the commutator 134.

Flat Type Vibration Motor

Second Embodiment

Figure 7:
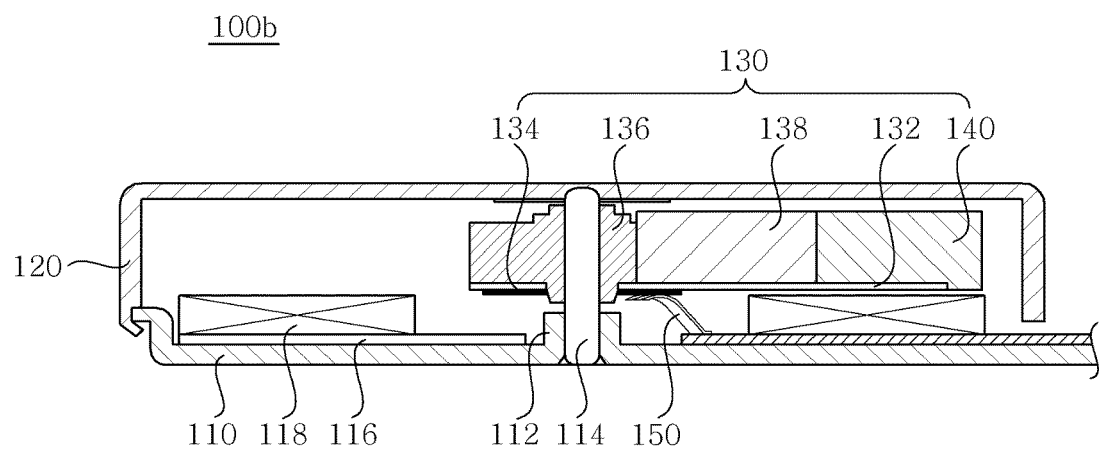
FIG. 7 is a sectional view illustrating a flat type vibration motor according to a second embodiment of the present invention.
Figure 8:
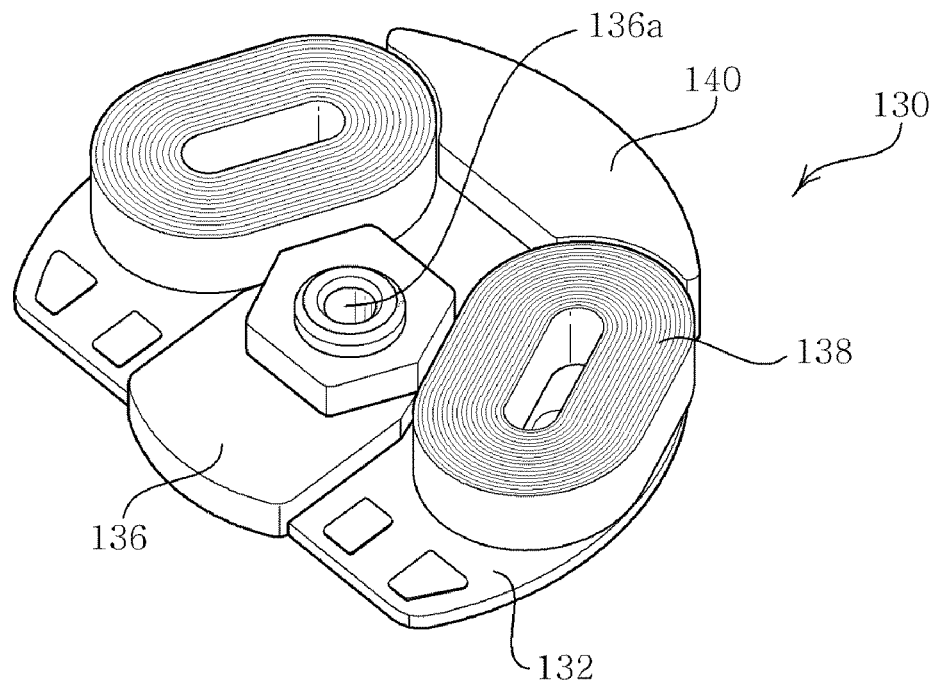
FIGS. 8 and 9 are a top perspective view and a bottom perspective view, respectively, illustrating a rotor of the flat type vibration motor of FIG. 7.
Figure 9:
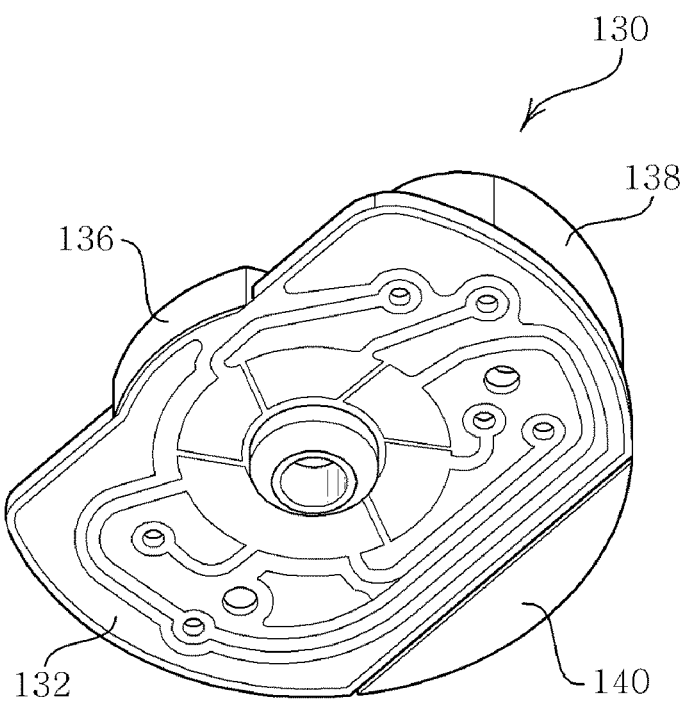

FIG. 7 is a sectional view illustrating a flat type vibration motor according to a second embodiment of the present invention, and FIGS. 8 and 9 are a top perspective view and a bottom perspective view, respectively, illustrating a rotor of the flat type vibration motor of FIG. 7. The flat type vibration motor 100*b* according to this embodiment will be described below with reference to the accompanying drawings. Meanwhile, in the description of this embodiment, those components common to both the first and second embodiments will have the same reference numerals.

As shown in FIGS. 7 to 9, the flat type vibration motor 100*b* according to this embodiment includes a bracket 110, a casing 120, a rotor 130, and a brush 150. Unlike the flat type vibration motor 100*a* of FIG. 4, the rotor 130 of the vibration motor 100*b* does not have a bearing 142. Except for this difference, the flat type vibration motor 100*b* according to the second embodiment is identical with the flat type vibration motor 100a according to the first embodiment, so that a duplicate description will be omitted herein.

That is, according to this embodiment, the rotor 130 includes an upper substrate 132, a coil 138, a weight 140, and a resin member 136. The resin member 136 is injection molded using a material having high lubricating ability and abrasion resistance, for example, liquid crystal polymer (LCP) to have a shaft insertion hole 136*a*, thus serving as a bearing. According to the present invention, since the injection molding process is performed in the state where the coil 138 is not adhered to the upper substrate 132, the injection pressure and the injection temperature may be increased. Thus, the resin member 136 of a more compact structure may be obtained through injection molding. Therefore, the resin member 136 manufactured in this way can substitute for a bearing.

As described above, the present invention provides a flat type vibration motor, in which a resin member having a bearing holding hole is formed on an upper substrate through injection molding and thereafter a coil and a bearing are adhered to the upper substrate, thus preventing the coil from becoming severed or deformed and preventing oil from leaking out from the bearing due to high injection temperature and injection pressure, and in which a test is carried out only once after the injection molding process unlike the conventional vibration motor wherein tests are carried out before and after the injection molding process, therefore simplifying the test process.

Further, according to the present invention, in the state where upper substrates are arrayed, an injection molding process and a coupling process of components can be performed, thus simplifying processes including the injection molding process and preventing the waste of labor.

Furthermore, according to the present invention, after the injection molding process, the bearing is adhered to the upper substrate through force-fitting or bonding, thus preventing impurities from entering the bearing during the injection molding process.

Further, according to the present invention, a resin member is used within a minimum range for holding the bearing and other components are adhered using an adhesive, so that it is not necessary to form the resin member throughout a whole area of the upper substrate so as to hold the bearing and couple other components with each other, unlike the conventional vibration motor, thus reducing a cost of materials.

According to the present invention, after the resin member is formed on the upper substrate through injection molding, a weight is adhered to the upper substrate, so that it is possible to place the weight on the outermost circumference of a rotor, and thus the quantity of eccentricity is increased in comparison with the conventional vibration motor and the whole vibratory force is enhanced.

Further, according to the present invention, in the state where the resin member having the bearing holding hole is formed on the upper substrate through injection molding, the coil and the bearing are attached, so that the degree of freedom of the injection molding process is increased, thus allowing the injection molding process to be performed under higher injection pressure and higher injection temperature. Thus, if the resin member is injection molded using a material having high lubricating ability and abrasion resistance, the resin member can serve as the bearing for holding a shaft. That is, the vibration motor can be manufactured without an additional bearing.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A flat type vibration motor, comprising:
   a bracket having a shaft mounted to a central portion of the bracket, with a lower substrate and a magnet being adhered to an upper surface of the bracket;
   a casing covering an upper portion of the bracket, and defining an internal space;
   an upper substrate having on a lower surface thereof a commutator and having a through hole;
   a coil and a weight adhered to an upper surface of the upper substrate;
   a resin member provided on some portion of the upper substrate where the coil and the weight are not adhered and having a bearing holding hole;
   a bearing held in the bearing holding hole, and rotatably supported by the shaft; and
   a brush secured at a first end thereof to the lower substrate, and contacting at a second end thereof to the commutator to form a contact part,
   wherein the resin member is injection molded integrally with the upper substrate, or the resin member is manufactured through injection molding, and is secured to the upper substrate through force-fitting, and the resin member is formed around a region into which the bearing is inserted to have the bearing holding hole, and the coil and the weight are not surrounded with resin.

2. The flat type vibration motor as set forth in claim 1, wherein the coil and the weight are adhered to the upper substrate using an adhesive or double-sided tape.

3. The flat type vibration motor as set forth in claim 1, wherein the bearing is held in the bearing holding hole through force-fitting.

4. The flat type vibration motor as set forth in claim 1, wherein the bearing is adhered to the bearing holding hole using an adhesive.

5. A flat type vibration motor, comprising:
   a bracket having a shaft mounted to a central portion of the bracket, with a lower substrate and a magnet being adhered to an upper surface of the bracket;
   a casing covering an upper portion of the bracket, and defining an internal space;
   an upper substrate having on a lower surface thereof a commutator and having a through hole;
   a coil and a weight adhered to an upper surface of the upper substrate;
   a resin member provided on some portion of the upper substrate where the coil and the weight are not adhered, and having a shaft insertion hole therein to support the shaft; and
   a brush secured at a first end thereof to the lower substrate, and contacting at a second end thereof to the commutator to form a contact part,
   wherein the resin member is injection molded integrally with the upper substrate, or the resin member is manufactured through injection molding and is secured to the upper substrate through force-fitting, and the resin member is formed around the shaft insertion hole, and the coil and the weight are not surrounded with resin.

6. The flat type vibration motor as set forth in claim 5, wherein the coil and the weight are adhered to the upper substrate using an adhesive or double-sided tape.

* * * * *